Feb. 21, 1961 R. J. KURVERS 2,972,392
AIRCRAFT MAINTENANCE PLATFORM
Filed Feb. 8, 1957 4 Sheets-Sheet 1
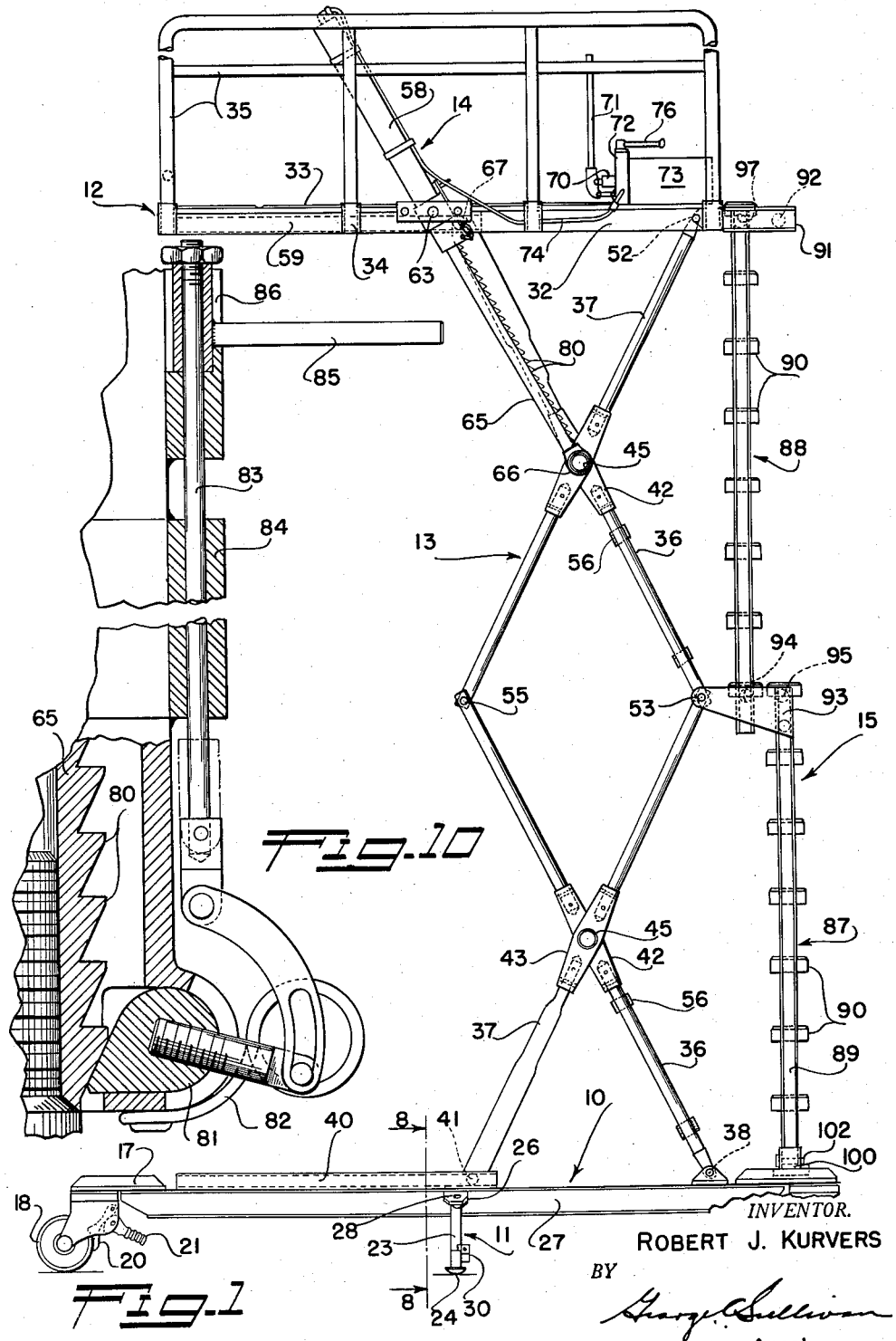
INVENTOR.
ROBERT J. KURVERS
BY
Agent

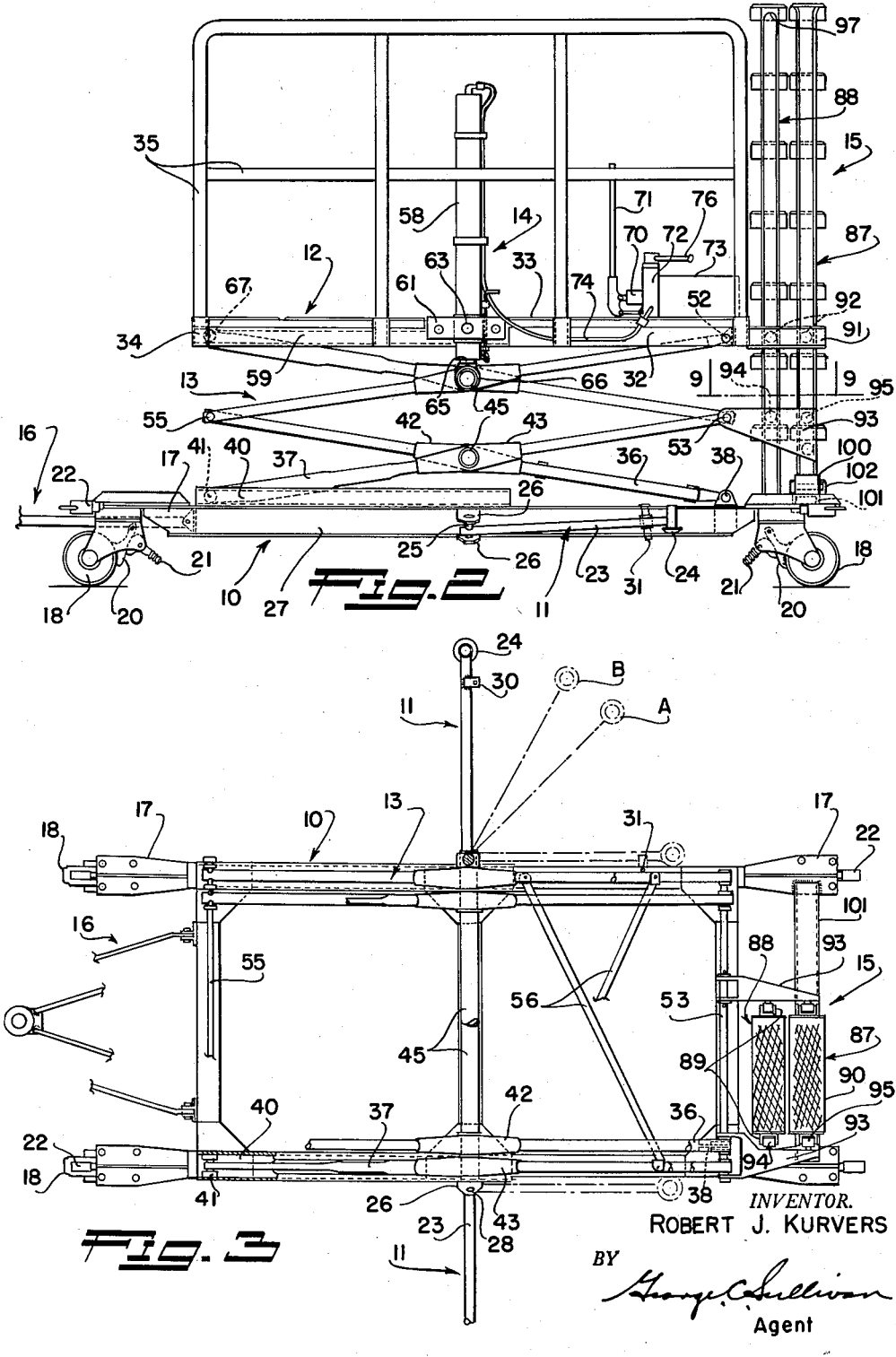

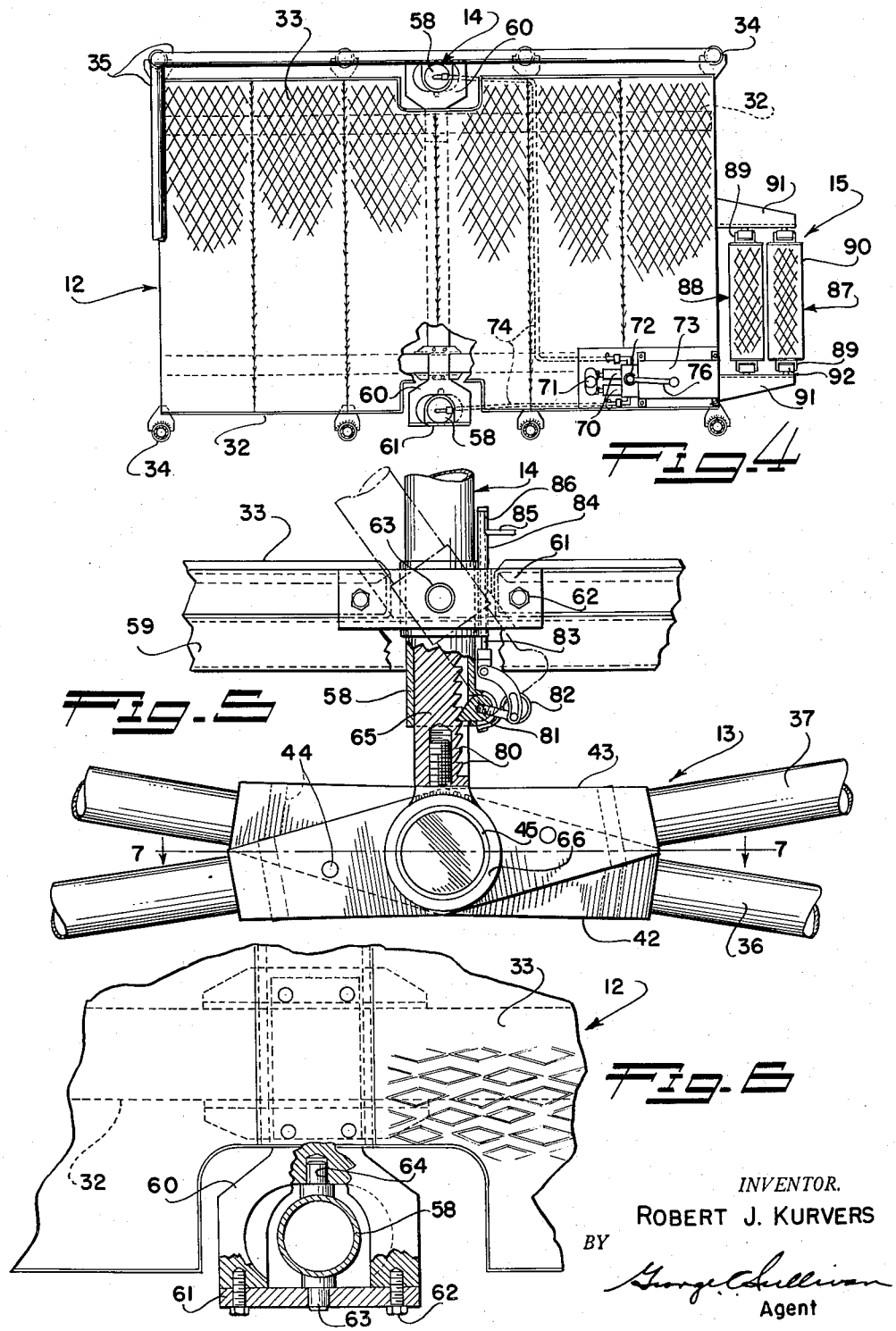

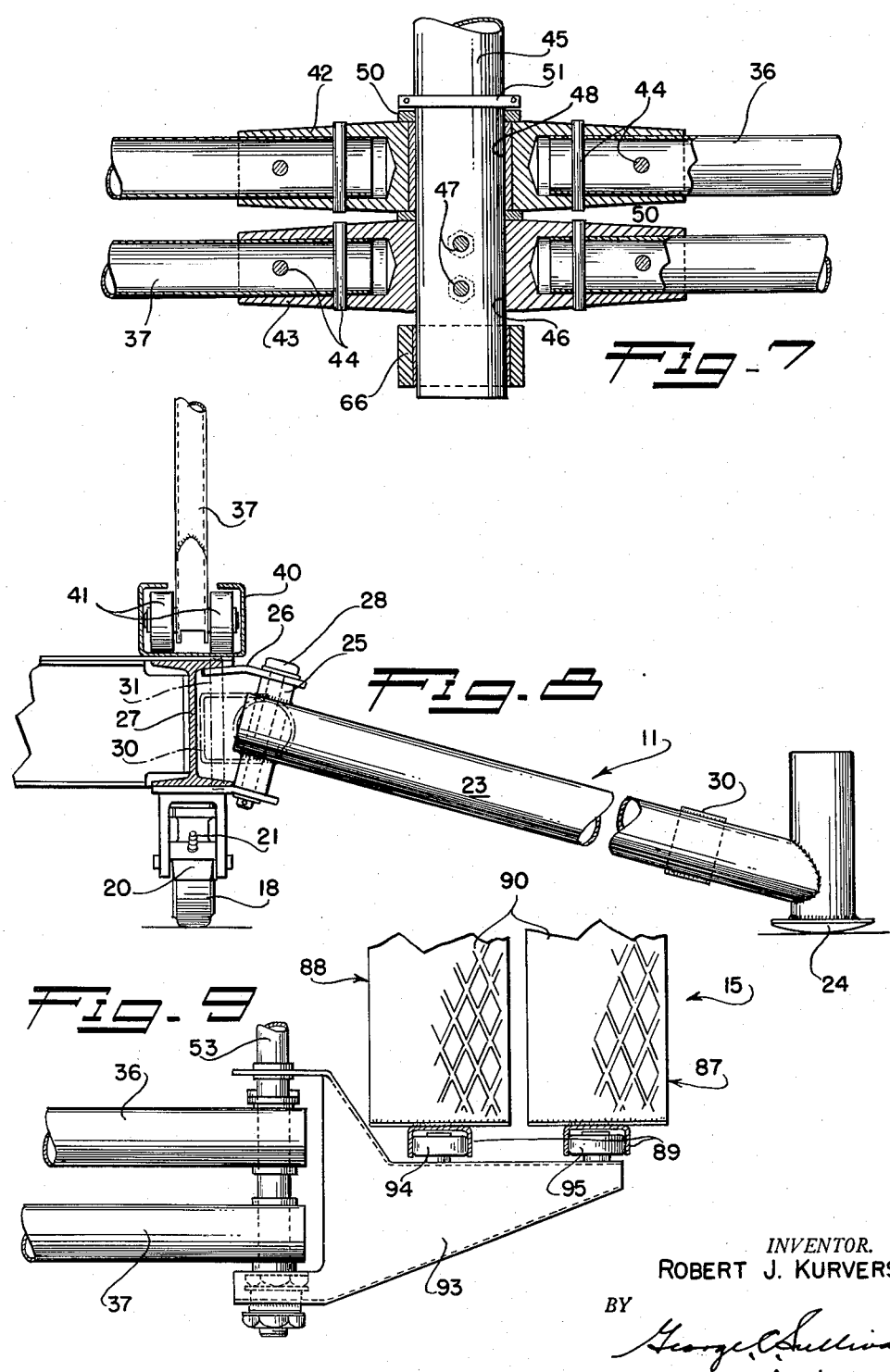

United States Patent Office 2,972,392
Patented Feb. 21, 1961

2,972,392

AIRCRAFT MAINTENANCE PLATFORM

Robert J. Kurvers, North Hollywood, Calif., assignor to Lockheed Aircraft Corporation, Burbank, Calif.

Filed Feb. 8, 1957, Ser. No. 639,018

1 Claim. (Cl. 182—148)

This invention relates to work stands or platforms, and relates more particularly to vertically adjustable work or maintenance platforms well adapted for use in the aircraft industry and related fields. In the aircraft industry it is necessary to provide stands or platforms to support the technicians and workmen while installing, inspecting, repairing and servicing elevated parts and regions of the airplanes. As a general rule, these platforms have limited ranges of vertical adjustment, for example from three to seven feet and from seven to twelve feet. These limitations in the vertical adjustment or range of extension usually require the provision of a large number of platforms of assorted types, sizes and operative ranges. Furthermore, the maintenance platforms now currently employed are not capable of being readily dismantled and stacked one upon the other for convenient compact transportation by air.

It is a general object of this invention to provide extensible aircraft maintenance stands having operative ranges of vertical movement or vertical adjustment much greater than the aircraft platforms now in use. For example, the Armed Services now employ aircraft maintenance stands known as type B-4 having a range of vertical adjustment of from 3 to 7 ft. and similar platforms known as type B-5 having a range of adjustment of from 7 to 12 ft., both of which are required in most aircraft service and maintenance operations. The platforms of this invention may be constructed to each have a practical operative range of vertical adjustment of from 3 to 12 ft., for example, so that a single platform of the invention will serve all of the purposes of both the B-4 and B-5 type stands now currently in use.

Another object of the invention is to provide extensible and contractible work or maintenance platforms of this kind that are light in weight, relatively inexpensive and capable of being readily "knocked down" or disassembled so as to be compactly stacked one upon the other for convenient shipping, storage and handling.

Another object of the invention is to provide vertically adjustable platforms constructed so that their range of vertical adjustment may be easily altered. The platforms embody scissor units, supporting the workmen's platform proper for vertical movement, and these units are connected and related so that one or more units may be added to the assembly to increase the maximum range of vertical adjustment and one or more units may be subtracted or removed to decrease the range of adjustment.

A further object of the invention is to provide a maintenance platform of this class characterized by a unique arrangement of hydraulic lifting rams and pump combination assuring maximum utilization of the ram force and maintaining the hydraulic fluid pressure entry ports of the rams in the same plane as the pump means to materially simplify the general hydraulic system.

It is a further object of this invention to provide a platform of the character described incorporating an access ladder which has a minimum of overlap of its sections when the platform and ladder are extended. The extensible ladder which extends from the wheeled base to the workmen's platform proper, has an upper ladder section associated with the tie-rod at the center axis of the double scissors elevating linkage so as to rise at a rate which is one-half the rate of elevation of the platform proper so that when the platform is fully extended there is only sufficient overlap of the ladder sections to bring the treads or rungs of the two ladder sections in proper spaced relationship.

A still further object of the invention is to provide an extensible maintenance platform having "outrigger" stabilizers projectible from opposite sides of the base and pivoted on canted axes so as to automatically conform with uneven terrain for the stabilization of the device as a whole. This automatic action of the stabilizers makes it unnecessary to include the usual screw-jack type adjustable pads for engaging the ground or floor.

Other objectives and features of the invention will become apparent from the following detailed description of a typical preferred embodiment throughout which description reference will be made to the accompanying drawings wherein:

Figure 1 is a side elevation of a maintenance platform of this invention in the fully raised or extended condition;

Figure 2 is a side view of the platform in its lowered or contracted condition with the outrigger stabilizers raised;

Figure 3 is a horizontal sectional view of the structure with the elevator scissor links broken or sectioned at different elevations and with broken lines illustrating several positions of the projectible stabilizers;

Figure 4 is a top or plan view of the platform showing the workmen's platform proper, the extensible ladder and other parts with certain portions broken away to illustrate a mounting of an elevating ram;

Figure 5 is an enlarged fragmentary side elevation view of the connection of one of the rams with the elevating linkage with a part of the ram mechanism and ratchet means appearing in vertical cross section and with broken lines illustrating an inclined position of the ram;

Figure 6 is an enlarged fragmentary elevation view showing the mounting of a ram with certain portions appearing in horizontal cross section;

Figure 7 is a horizontal detailed sectional view taken substantially as indicated by line 7—7 on Figure 5;

Figure 8 is an enlarged fragmentary vertical sectional view taken substantially as indicated by line 8—8 on Figure 1, showing one of the stabilizers in elevation;

Figure 9 is a fragmentary, enlarged horizontal sectional view taken substantially as indicated by line 9—9 on Figure 2 with certain parts appearing in elevation; and Figure 10 is an enlarged, fragmentary vertical sectional view showing one of the releasable ratchet means of a ram unit.

The platforms of the invention may, of course, be designed, proportioned and constructed for given applications, particularly in view of their extensive range of vertical adjustment and the ability to increase or decrease the maximum elevation at will. In the drawings I have illustrated one embodiment of the invention well suited for aircraft use and will proceed with a description of the same, it being understood this is not intended to restrict the invention to this particular embodiment or application.

The device of the invention may be said to comprise, generally, a wheeled base 10 having projectible and retractable stabilizers 11, a platform 12 for the workmen, multiple scissors linkage 13 supporting the platform 12 on the base 10 for vertical movement, pump and ram means 14 connected between the platform 12 and the linkage 13 for moving the platform vertically and an extensible ladder 15 extending between the base 10 and the platform 12.

The base 10 is a generally rectangular structure constructed of I beam stock, or the equivalent, and is provided at at least one end with a hinged tow bar arrangement 16. Fore and aft extensions 17 on the corners of the base 10 are provided with casters 18. The casters 18 may include brake shoes 20 actuated by handles 21, see Figure 2, and appropriate means 22 may be provided for holding the individual casters against castering movement.

The above mentioned stabilizers 11 are provided on the base 10 and are projectible laterally therefrom to come into engagement with the floor or ground at points spaced outboard from the base to stabilize the entire device. It is a feature that these stabilizers 11 are effective in coming into effective pressure engagement with the ground even in situations where the terrain is quite uneven. This automatic conforming feature of the stabilizers makes it unnecessary to provide the maintenance stand with the costly, heavy adjustable screw-jack ground engaging pads customarily employed on such devices. As best illustrated in Figures 3 and 8, each stabilizer 11 includes a rod or tube 23 provided at its outer end with a pad or foot 24 suitably shaped for engagement with the field or ground. The inner end of each stabilizer rod 23 has aligned tubular bosses 25 with a common axis perpendicular to the longitudinal axis of the rod. In accordance with the invention the stabilizers 11 are mounted on the base 10 to rotate or pivot about axes canted or pitched outwardly and upwardly with respect to the base 10. The means for mounting the stabilizers 11 for this movement include brackets 26 welded or otherwise attached to the longitudinal beams 27 of the base 10. The brackets 26 protrude laterally from the beams 27 and their outer portions are turned downwardly in parallel relation and are spaced apart to receive the tubular bosses 25 of the stabilizers. Shafts or pivot pins 28 extend through openings in the brackets 26 and the tubular bearings or bosses 25 are canted or sloped upwardly and outwardly to support the stabilizers 11 for angular or turning movement between retracted positions where they lie at or adjacent the base beams 27 and extended positions where they project laterally and downwardly to have their feet 24 engage the ground. Figure 8 and the full line illustration of Figure 3 show the stabilizers 11 in fully extended positions where they project substantially straight out from the base 10 relative to the fore and aft axes of the base but slope downwardly to have their feet 24 bear on the ground. Due to the inclination of the pivotal axes of the stabilizers 11 their feet 24 move downwardly as the stabilizers are swung away from the base 10 and as indicated by the broken line positions A and B of Figure 3, the terrain may be such that the stabilizer feet 24 will come into pressure engagement with the ground at different positions and levels. The rods 23 of the stabilizers 11 may carry clips 30 adapted to be detachably anchored to the beams 27 by pins 31 to hold the stabilizers in their retracted positions alongside the base 10.

The platform 12 is a rectangular structure including a frame 32 carrying appropriate flooring 33. The flooring 33 is preferably sheet metal having a pressed anti-slip upper surface. Vertical sockets 34 are secured to the outboard edges of the platform 32 at its corners and at spaced points along its sides to receive the lower ends of railings 35. The railings 35, which are removable from their sockets 34, are preferably constructed of aluminum tubing. The railings may be open or omitted at the end of the platform 12 to give access to the ladder 15. As illustrated, the planform size, shape and area of the platform 12 may be substantially the same as those of the base 10.

The multiple scissors linkage 13 supports the workmen's platform 12 for vertical movement on the base 10. The linkage is characterized by two linkage systems or mechanisms each having one, two or more pairs of crossed links 36 and 37. The two sets of links 36 and 37 lie in or adjacent the vertical planes occupied by the side members or beams 27 of the base frame 10. The links 36 of the two lower pairs each have an end pivotally anchored at 38 to the base 10 adjacent a corner of the base. The links 37 of the two lower pairs of links are restrained and guided for longitudinal movement along the base 10. To this end, channels or tracks 40 are secured to the upper sides of the base beams 27 and the lower ends of the links 37 carry pairs of rotatable rollers 41 for operation in the tracks. The tracks 40 are of reclined C shape in vertical cross section to effectively guide the rollers 41 and links 37 and to prevent their disengagement from the base 10. The ends of the tracks 40 may be open to facilitate assembly of the device. Each truss or link 36 may comprise two sections of steel tubing, or the equivalent, connected intermediate the ends of the links by what I will term pivot fittings 42 and each link 37 may also comprise two sections of steel tubing connected by similar pivot fittings 43. The fittings 42 and 43 are socketed to receive the ends of the link sections and transverse pins, bolts, or rivets 44, secure the tubing ends in the fittings, see Figure 7. The links 36 are at the inner sides of the links 37 and may be considered the inner trusses or links and the links 37 may be considered the outer trusses or links. Horizontal torque tubes 45 extend between and connect the corresponding trusses or links 37 at the two sides of the assembly and pivotally support the companion links 36. As best shown in Figures 1, 3 and 7, the tubes 45 are secured in central openings 46 in the truss fittings 43 by transverse bolts 47 and pass through bushed central openings 48 in the pivot fittings 42. With this arrangement the companion trusses 36 and 37 are free to rotate or pivot with respect to one another. Washers 50 on the torque tubes 45 hold the fittings 42 and 43 in spaced relation and stop collars 51 on the tubes retain the washers, bushings, etc. The torque tubes 45 of the uppermost pairs of links or trusses 36 and 37 protrude outwardly beyond the fittings 43 for engagement by the ram means 14, as will be later described.

The upper ends of the uppermost links 37 are pivotally connected with the frame 32 of the platform 12 at hinge or pivot connections 52. The upper ends of the lowermost trusses or links 37 and the lower ends of the links 36 of the next pairs of links are pivotally connected together. In the preferred construction a pivot rod or tie-bar 53 extends horizontally from one side of the assembly to the other to pivotally connect the upper ends of the lowermost links 37 with the lower ends of the links 36 of the next sets of trusses or links. As will be later described, the rod 53 is anchored to or connected with brackets 93 of the ladder means 15. In this connection it should be observed that the hinge or pivot connections 52 and 53 remain in vertical alignment with the lower truss mounts 38 although they move vertically upward and downward when the platform 12 is adjusted vertically.

The upper ends of the links or trusses 36 of the upper sets of scissors are connected with the platform 12 by tracks and rollers. Tracks 59 are secured to the underside of the platform frame 32 to extend along its sides and the upper ends of the upper trusses 36 have pairs of rollers 67 operating in the tracks. The tracks 59 and rollers 67 may be the same as the tracks 40 and rollers 41, described above, except that the open sides of the C shaped tracks 59 face downwardly. The tracks 59 and rollers 67 connect the upper links or trusses 36 with the platform 12 for horizontal movement as the platform is raised and lowered and, of course, assist in supporting the platform on the scissors assembly 13.

The upper ends of the lowermost links 36 and the lower ends of the trusses or links 37 of the next sets of links are pivotally connected by a horizontal tie-rod or pivot rod 55. The spaced torque tubes 45 and tie-rods or axis rods 53 and 55, as well as the connections of the scissors truss or link assembly with the platform 12 and the inherent rigidity of the high strength links 36 and 37 stabilize the structure against lateral swaying and displacement even when the platform 12 is at its higher positions. However, in order to further reinforce and stabilize the scissors link mechanism horizontal diagonal braces 56 extend between and connect the corresponding links 36 of the several sets of links.

The pump and ram means 14 is located at the platform 12 and is operable by the workmen to raise or elevate the platform to the selected or required heights for work on the airplanes or other structures. As indicated above, the means 14 is connected with the upper ends of the uppermost torque tube 45. The means 14 includes hydraulic lifting cylinder and piston mechanisms or rams 58 arranged at opposite sides of the platform 12. The floor 33 is cut out at each side to accommodate the rams 58 with clearance. Forks or yokes 60 are fixed to the platform frame 32 to extend below these cut-out floor areas and the hydraulic mechanisms 58 pass through the yokes. Plates 61 are removably secured to the yokes 60 by screws 62 to extend across the mouths of the yokes. Pins or gimbals 63 on the hydraulic ram mechanisms 58 pivotally engage in openings 64 in the yokes 60 and plates 61 to support the platform 12 on the mechanisms. The hydraulic mechanisms 58 have plungers or pistons 65 extending from their lower ends and these pistons are connected with the uppermost torque tube 45 of the truss or link assembly 13. In the construction illustrated, the lower ends of the pistons 65 have transverse or horizontal tubular attachments or bosses 66 surrounding or engaged on the above mentioned protruding ends of the uppermost torque tubes 45. The bosses 66 carry bushings or bearings for engaging on the tubes 45 and are adapted to be slid over the ends of the tubes. Thus, prior to installation of the plates 61 the collars or bosses 66 are easily slid over the ends of the tubes 45 whereupon one gimbal 63 of each mechanism 58 is engaged in the yoke opening 64 and the associated plate 61 is secured in place. This arrangement is such that the ram or hydraulic mechanisms 58 may be easily and quickly detached when the device is to be stored or shipped and may be readily reinstalled for operation.

With the hydraulic ram mechanisms 58 arranged as above described they are operable to raise the platform 12 from the lowered position of Figure 2 to the elevated position of Figure 1, the pistons 65 of the mechanisms extending from the ram units to effect this vertical adjustment. It should be noted that the extensible hydraulic ram mechanisms 58 are connected between the platform 12 and the uppermost scissors torque tube 45 so as to utilize the ram forces most advantageously.

The hydraulic actuating means 14 further includes a hydraulic pump unit for developing hydraulic pressure for the actuation of the ram mechanisms 58. I prefer to employ a hand pump having two cylinder and piston units 70 operable by a common handle 71. The pumps 70 are associated with a valve 72 and a reservoir 73, these elements constituting an assembly mounted on the platform 12 in a corner thereof. Hydraulic pressure lines 74 extend from the pumps 70 to the upper ends of the ram mechanisms 58. There is a line 74 connecting one pump 70 with the other ram mechanism 58 and the pump handle 71 is operatively connected with the two pumps so that with any given motion of the handle an equal volume of hydraulic fluid is delivered under pressure to the two ram mechanisms 58 regardless of any unsymmetrical loading condition that may exist on the platform 12. This assures uniform and horizontal conditions for the platform 12 irrespective of the particular loading on the platform. The valve 72 is equipped with an operating handle 76 adapted to be moved between a position where the pumps 70 are operable to supply actuating fluid pressure to the ram mechanisms 58 and a position where the fluid pressure is allowed to return from the ram mechanisms to the reservoir 73. In practice the valve 72 is designed so as to cause or allow a controlled or determined rate of downward travel of the platform 12 when the handle 76 is in the latter position.

It is preferred to associate manually releasable ratchet means with the ram mechanisms 58 to prevent inadvertent or unwanted downward travel of the platform 12 from an elevated position. These means include series of ratchet teeth 80 on the pistons 65 of the mechanisms 58 and pivoted ratchet dogs 81 engageable with the teeth. The dogs 81 are mounted on the lower ends of the mechanisms 58 and are urged into cooperation with the teeth 80 by coiled springs 82. Rods 83 are operatively connected with the dogs 81 and are guided in tubular guides 84 on the mechanisms 58 for vertical movement. Handles 85 project laterally from the upper portions of the rods 83 and are adapted to be manually raised to disengage the ratchet dogs 81 from their teeth 80. The guides 84 have vertical slots 86 which receive the handles 85 for vertical movement. When the handles 85 are raised to free the ratchet dogs 81 they are turned slightly to move out of register with the slots 86 and to rest on the upper ends of the guides 84 so as to retain the ratchet dogs 81 in the released positions. It will be seen how the ratchet dogs 81 engaging with the teeth 80 serve to positively prevent downward travel of the platform 12. The pump handle 71, valve handle 76 and ratchet handles 85 are all conveniently accessible to the workmen on the platform 12.

The extensible ladder 15 is arranged at an end of the assembly and is provided to give convenient access from the ground to the platform 12 with the platform in any position or elevation. The ladder 15 includes two sections 87 and 88 both comprising two spaced vertical side members 89 and vertically spaced treads 90 extending between and carried by the members 89. The ladder section 87 has its lower end secured in sockets 100 on an end member 101 of the base 10 by removable pins or bolts 102. In accordance with the invention the ladder 15 is associated with the scissors linkage 13 and the platform 12 to be automatically extended from the fully contracted condition of Figure 2 to the extended position of Figure 1 when the platform 12 is raised. The side members 89 of the ladder sections 87 and 88 are in the nature of or are formed with tracks or channels. Horizontal extensions or brackets 91 project from an end of the platform 12 and have horizontally spaced rollers 92 rotatable about horizontal axes and engageable in the spaced channel members 89 of each ladder section. As best shown in Figures 2, 3 and 9, brackets 93 are carried by the hinge rod or tie-rod 53 of the linkage 13 and extend horizontally outward to be in vertical alignment with the brackets 91. One bracket 93 straddles the adjacent ends of the trusses or links 36 and 37 to be supported on the tie-rod 53 while the other bracket 93 is spaced between the sets of links and merely bears on the rod 53. Each bracket 93 has a roller 94 for engaging in a channel of the upper ladder section 88 and each bracket 93 also has two vertically spaced rollers 95 for engaging with the channel 89 of the lower ladder section 87. In assembling the ladder 15 the section 87 is merely moved downwardly in a vertical position and with the platform collapsed, as shown in Figure 2, so that its channels 89 receive and pass downwardly on the rollers 92 and 95 to bring its lower end to the plane of the base 10 whereupon the pins or bolts 102 are installed to secure the section to the base 10. The upper ladder section 88 is likewise moved downwardly while in a vertical position so that its channels 89 receive or engage with the inner rollers 92 of the brackets 91 and the rollers 94 of the brackets 93. The upper ends of the channels 89 of the ladder section 88 are closed by walls or stops 97 which are engaged by the inner rollers 92 of the platform brackets 91 when the platform 12 is raised. However, prior to such elevation of the platform 12 the lower ends of the members 89 of the upper ladder section 88 may rest on the base 10, as shown in Figure 2. It will be observed that the roller carrying brackets 93 are associated with the centrally located tie-rod 53 of the linkage 13 so as to move vertically at one-half the rate of the platform 12 when the latter is elevated and lowered. Thus the inner or upper ladder section 88 will remain with its lower end resting on the base 10 until the platform 12 has been raised to approximately one-half of its maximum height whereupon the stops 97 of the ladder section 88 will be engaged by the rollers 92 of the platform brackets 91 and upon continued elevation of the platform 12 this engagement will cause the ladder section 88 to move upwardly with the platform. As shown in Figure 2, the ladder 15 is fully contracted with the two sections 87 and 88 in directly opposed relationship when the platform 12 is fully lowered. It will also be observed that when the platform 12 is fully extended, as shown in Figure 1, there is a minimum of overlap of the platform sections 87 and 88. The ladder 15, being anchored to the base 10 by pins or bolts 102 and having the channel and roller engagement with the brackets 91 and 93 assist in stabilizing the linkage 13 and the platform 12 against swaying, and lateral and fore and aft movement.

In situations where it is desirable to construct the device or stand to have a minimum weight the major components and parts of the base 10, the platform 12 and the ladder 15 may be constructed of aluminum. From the foregoing description it will be seen that the device is extremely compact when fully contracted, as shown in Figure 2, and if further compactness is desired for shipping the ladder 15 may be removed by merely raising the section 88 out of the brackets 91 and 93 and by removing the pins or bolts 102 and then raising the section 87 upwardly through the brackets 93. The plunger or ram units 58 are easily detached by removing the screws 62 and bolts 61 whereupon the entire ram mechanisms may be detached from the platform 12 and, if desired, laid flat on its floor 33. The railings 35 are quickly removed from their sockets 34. In use, the workmen merely climb onto the platform 12 by employing the ladder 15 and actuate the pump handle 71 to deliver the actuating fluid pressure to the ram units 58. The actuated ram units 58, acting between the platform 12 and the upper torque tube 45, efficiently raise the platform 12. As above described the dual pumps 70 supply equal volumes of actuating fluid to the ram units 58 to assure equalized elevation of the platform regardless of its loading. The ratchet dogs 81 assure positive retention of the platform 12 in any raised position and, of course, the valve 72 may be closed so that the ram units themselves serve to retain the platform elevated. To lower the platform the ratchet dogs 81 are released by latching the handle 85 in its raised position and the valve 76 is opened to allow the return of the fluid to the reservoir 73 at a controlled rate. As mentioned above, the maximum range of adjustability of the platform 12 may be increased by adding pairs of scissor trusses 36 and 37 to the linkage means 13. The automatic compensating stabilizers 11 may be utilized to stabilize the structure when necessary.

Having described only a typical form of the invention I do not wish to be limited to the specific details herein set forth, but wish to reserve to myself any variations or modifications that may appear to those skilled in the art and fall within the scope of the following claim.

I claim:

A maintenance stand comprising a base, a work platform above said base, a plurality of scissor trusses sets supporting the platform on the base for vertical movement, each set including at least two crossed trusses and a fulcrum pivotally connecting the two trusses where they cross, each of said sets having the lower end of the lowermost truss pivotally connected to said base and the lower end of the other truss guided for horizontal movement on said base, each of said sets having an upper end of the uppermost truss pivotally connected to said platform and the other upper end of the other truss guides for horizontal movement on the platform, and means for moving the platform vertically comprising extensible and contractible cylinder and ram units each having two relatively movable parts, a first pivot means connecting one part of each unit to a fulcrum of a set of trusses, a second pivot means connecting the other part of said units with the platform whereby extension of the units raises the platform, a pump on the platform for each unit operable to supply actuating fluid under pressure to each of said units, and a common manually actuated means on the platform for operating the two pumps, the two pumps having equal volume capacity and the actuating means serving to impart equal strokes to the pumps whereby equal volumes of fluid are supplied to the two units, valve means associated with the pump means for controlling the units, said two pumps being interconnected by said common actuating means so that said platform will remain parallel to the surface of said base regardless of the force distribution upon said platform, and a ratchet means integrally formed in at least one of said ram units for preventing contraction of said cylinder and ram units, said ratchet means operable and releasable by means of ratchet dogs, said ratchet dogs operable by means of platform-mounted handles, said stand having horizontal hinge rods pivotally connecting the upper ends of the lowermost set of trusses with the lower ends of the adjacent set of trusses, and ladder means including brackets on one of said hinge rods, a lower ladder section having its lower end secured to said base, cooperating guide means on said brackets and the lower ladder section to hold the section vertically slidable, an upper ladder section hanging from said platform to rise and lower therewith, and guide means on said brackets slidably guiding the upper section in adjacent parallel relation to said lower ladder section, whereby said platform is collapsible upon said base to within the distance occupied by the collapsed scissor trusses so that said platform may be readily loaded and unloaded from ground position.

References Cited in the file of this patent

UNITED STATES PATENTS

| | | |
|---|---|---|
| 530,120 | Oakley | Dec. 4, 1894 |
| 1,155,958 | Rickard | Oct. 5, 1915 |
| 1,817,418 | Munns | Aug. 4, 1931 |
| 1,859,830 | Kummel | May 24, 1932 |
| 1,901,726 | Bonnet | Mar. 14, 1933 |
| 2,086,255 | Cashier et al. | July 6, 1937 |
| 2,466,155 | Conrad | Apr. 5, 1949 |
| 2,479,623 | Johnson | Aug. 23, 1949 |
| 2,611,579 | Guzey | Sept. 23, 1952 |
| 2,664,073 | Pine | Dec. 29, 1953 |
| 2,750,236 | Middendorf | June 12, 1956 |

FOREIGN PATENTS

| | | |
|---|---|---|
| 1,017,580 | France | Sept. 24, 1952 |